United States Patent [19]

Parenchuck

[11] 4,064,202
[45] Dec. 20, 1977

[54] METHOD OF ADJUSTING ROD TYPE SCRUBBER

[75] Inventor: Charles Stephen Parenchuck, South Windsor, Conn.

[73] Assignee: Combustion Engineering, Inc., Windsor, Conn.

[21] Appl. No.: 642,277

[22] Filed: Dec. 19, 1975

[51] Int. Cl.² .............................................. B01F 3/04
[52] U.S. Cl. .................... 261/44 R; 55/226; 261/109; 261/116; 261/DIG. 54
[58] Field of Search ............... 261/44 R, 109, 62, 102, 261/105, 114 VT, 96, 117, DIG. 9, DIG. 54; 55/226, 240, 229, 230, 231, 241

[56] References Cited

U.S. PATENT DOCUMENTS

| | | | |
|---|---|---|---|
| 877,460 | 1/1908 | Brunner et al. | 261/109 |
| 3,488,039 | 1/1970 | Ekman | 55/241 X |
| 3,544,087 | 12/1970 | McIlvaine | 261/109 X |
| 3,592,452 | 7/1971 | Katyal | 261/109 |
| 3,738,624 | 6/1973 | McIlvaine | 261/109 X |
| 3,746,322 | 7/1973 | Sawyer | 261/109 X |
| 3,761,064 | 9/1973 | Selway | 261/109 X |

*Primary Examiner*—Tim R. Miles
*Assistant Examiner*—Richard L. Chiesa

[57] ABSTRACT

A rod type wet scrubber having two trays or decks of rods that are normally in space relation relative to the gas flow and wherein alignment of the rods is initially achieved by mounting them in a manner that will permit lateral movement and then bringing the two trays together such that the rods are interspersed in contact and accurately aligned with each other. The rods of each tray are then secured in place in their respective positions to thereafter prevent lateral movement therebetween.

3 Claims, 4 Drawing Figures

METHOD OF ADJUSTING ROD TYPE SCRUBBER

BACKGROUND OF THE INVENTION

This invention is directed to rod type wet scrubbing apparatus for removing particulate matter from a gas stream. In scrubbers of this type it is conventional to mount a pair of rows or trays of spaced parallel rods in a restricted or throat area of the scrubber housing and to spray a washing liquid into the gas stream upstream of the location of these rods. In passing through the restricted zone where the rods are located the velocity of the particulate laden gas along with the water droplets contained therein is substantially increased and intimate contact between the water droplets and the particulate matter produced to cause an agglomerating action facilitating removal of the particulate matter from the gas streams.

The rods of one tray are oriented or disposed so as to be generally alternate or intermediate to the rods of the other tray, and one tray is preferably adjustable with respect to the other tray to thereby permit varying of the space between the rods of the two trays. With such an arrangement it is essential that the rods to the two trays be accurately aligned with respect to each other and this invention is directed to a way of simply and quickly assuring this accurate alignment.

BRIEF DESCRIPTION OF THE INVENTION

In accordance with the present invention the rods of each of the trays are initially mounted in a manner such that they may move laterally with respect to each other. While thus mounted the space between the two rods is closed, i.e., the adjustable tray of rods is moved into contact with the stationary tray such that the rods of one tray are interspersed with the rods of the other tray and are in engagement throughout their length. The rods are then in accurate alignment with respect to each other and they are then securely fastened to prevent lateral movement.

DESCRIPTION OF THE PREFERRED EMBODIMENT

Figure 1:
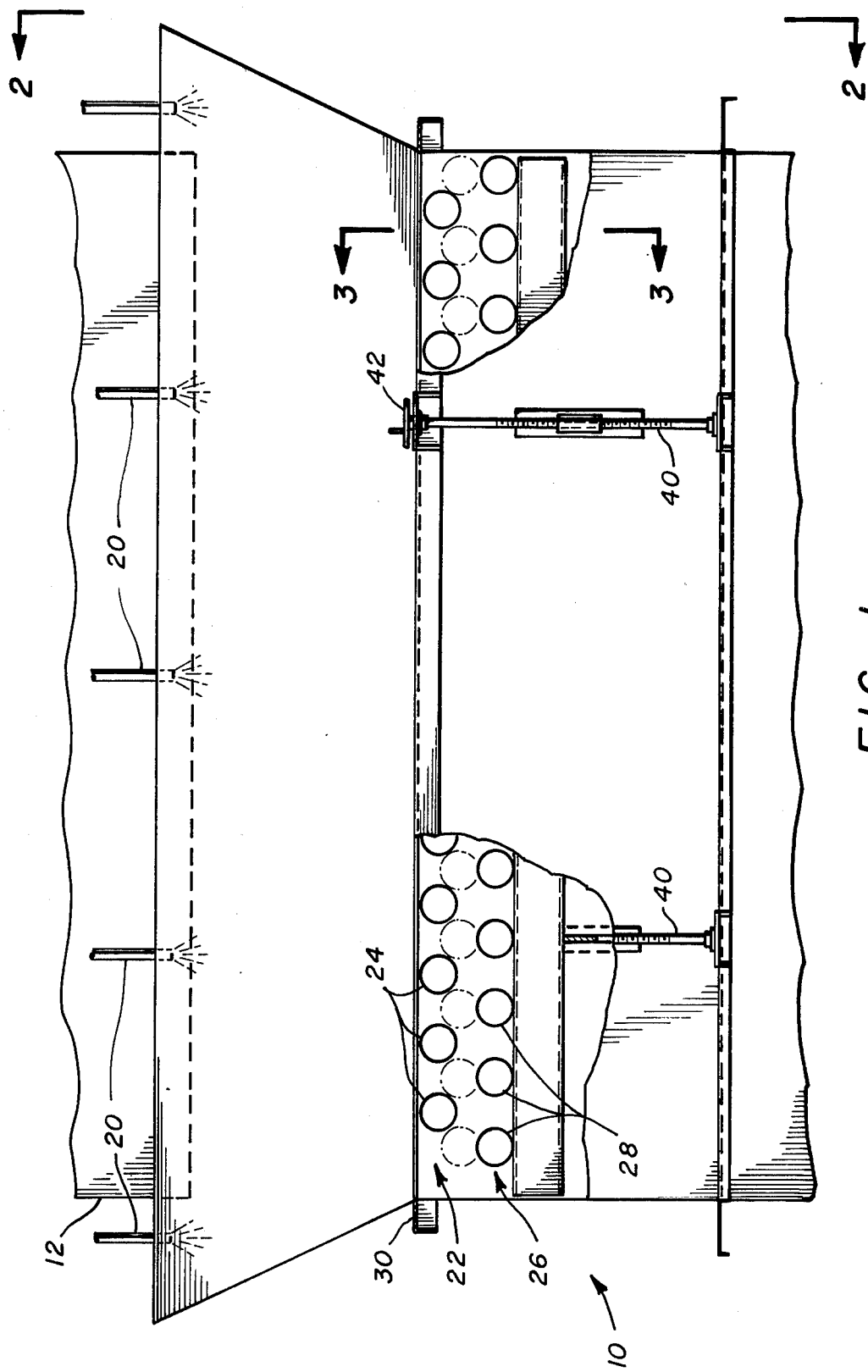
FIG. 1 is in the nature of a side view of a wet rod type scrubber embodying the present invention with portions being broken away to show the dispostion of the rods of the two trays or rows within the scrubber housing.

Referring now to the drawings wherein like reference characters are used throughout to designate like elements, the illustrative and preferred embodiment depicted therein includes a housing 10 into which a particulate carrying gas is introduced by means of the nozzle or duct 12. This gas enters the housing 10 at the inlet region 14 thereof with this region being formed by downwardly converging walls connecting with the restricted or throat region 16 of the housing. The gas traverses this restricted region and then enters the outlet region 18 from whence it is conveyed to a desired point.

A liquid is sprayed into the inlet region 14 as through the nozzles 20 and a scrubbing action takes place as the particulate laden gas and the water droplets pass through the restricted region of the scrubber to effectively remove a substantial portion of the particulate matter from the gas.

Figure 4:
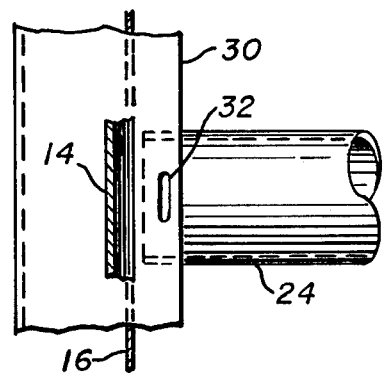
FIG. 4 is a detailed sectional view taken generally along lin 4—4 of FIG. 3.

Located in the restricted portion of housing 10 are the rod scrubber trays or rows. There are two rows or trays, an upper one identified generally as 22 and being composed of rods or tubes 24, and a lower one identified generally as 26 and being made up of rods or tubes 28. The rods or tubes 24 are in parallel relation and are mounted within the restricted portion of housing 10 by means of the structural bracket or angle member 30 which extends into the interior of the housing 10 and is provided at the location of each rod 24 with an elongated slot 32 (FIG. 4). There is received within each of these slots at the end of the rod 24 a suitable bolt 34. The bolt is snugly received in suitable openings in the rod 24 and prior to being securely tightened will move longitudinally of slot 32 to provide for a limited lateral adjustment of each of the rods 24. It is noted that in addition to providing support for the rods 24 the bracket 32 adds rigidity to the scrubber housing.

Figure 3:
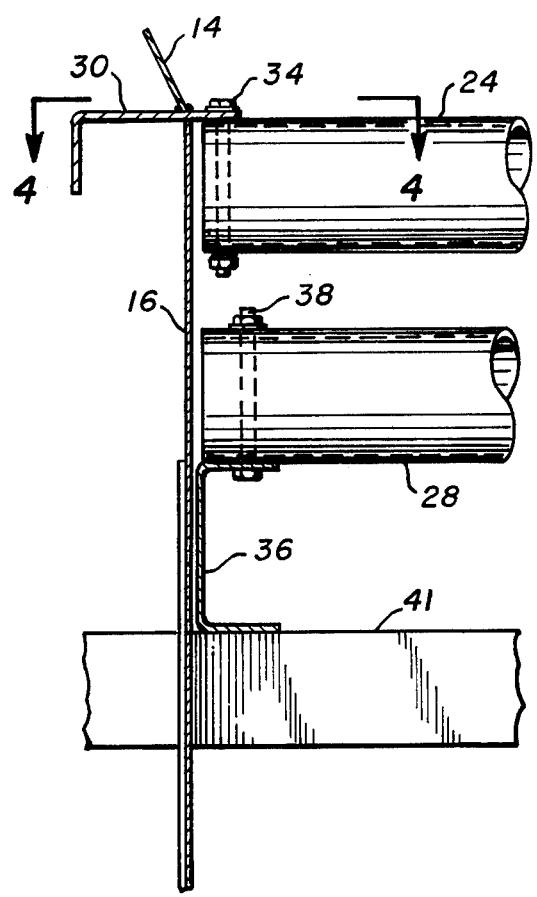
FIG. 3 is a detailed view generally taken along line 3—3 of FIG. 1, and showing the mounting of one end of the rods of each of the tray of rods.

The rods 28 of lower row 26 are mounted in a similar manner to provide for limited lateral movement of the rods 28 prior to tightening the fastening bolts. Thus, there is provided a structural member 36 that is U-shape in cross-section and extends adjacent the inner wall of the housing 10 as best shown in FIG. 3. There is one such member 36 at each end of the rods 28, and this member is provided with an elongated slot similar to slot 32 within which is received a bolt 38 that is in turn snugly received in openings in the members 28. Thus, prior to securely tightening the bolt 38 it is free to move within the slot in the member 36 and, thereby permit limited lateral movement of the rods 28.

Figure 2:
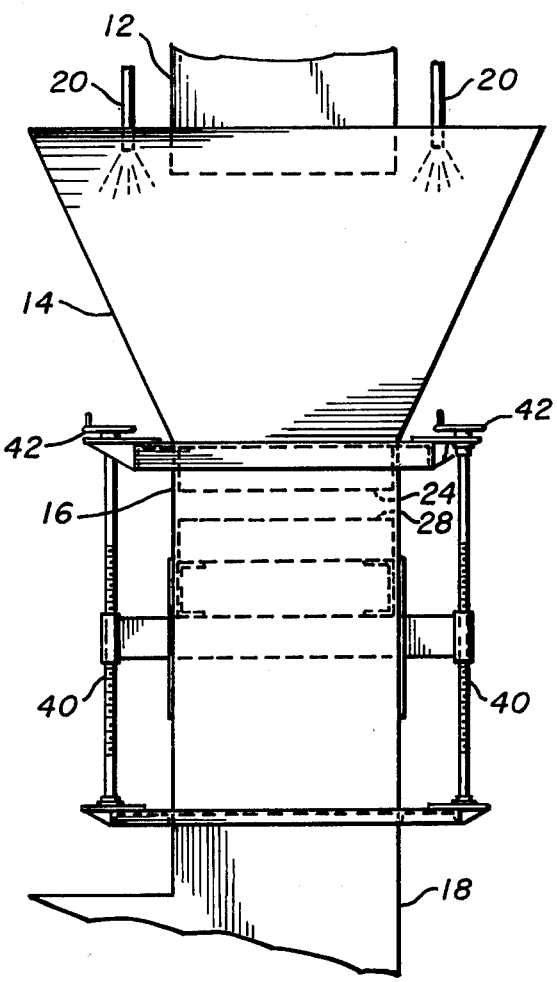
FIG. 2 is a view taken generally along line 2—2 of FIG. 1.

In order that the scrubbing action affected by the scrubber may be adjusted for different operating conditions the lower row 26 of rods 28 is adjustable vertically with respect to the upper row of rods 22. For this purpose the structural members 36 rest on the transversely extending support beams 41. These beams extend through suitable slots provided in the wall of housing 10, and are supported on the jacking members 40. There are two such jacking members 40 on each side of a pair of opposite sides of the housing as shown in FIGS. 1 and 2. The jacking members 40 are journalled at their upper and lower ends to suitable supports that are secured to the housing and they ae rotated by means of the handles 42. Rotation of the jacking members effects vertical movement of beams 40. Thus the lower row 26 of rods 28 may be moved up and down and thus adjusted with respect to the upper row 22 of rods 24.

As best shown in FIG. 1, the rods 28 are oriented so as to be disposed generally intermediate to rods 24. In order to provide for accurate orientation of the rods 24 and 28 with respect to each other, i.e, in order that the rods 28 will be parallel with the rods 24, which is extremely important for the proper operation of the rod type scrubber, because of the close tolerances that are necessary, the initial adjustment of the rods is obtained by mounting them loosely on their supports such that they may move laterally as permitted by the slots within which the mounting bolts are disposed. While thus mounted the lower row 26 is elevated to close the gap between the two rows and such that the rods 28 are interposed between the rods 24, as shown in dotted lines in FIG. 1 with the respective rods of the two rows being in contact throughout their length. In elevating the lower row 26 the plane of the axis of the rods 28 and the plane of the axis of the rods 24 are maintained parallel and thus when the rods 28 are interposed between the rods 24 in contact throughout their length with them the rods of both rows will be in parallel relation and accurately positioned with respect to each other. When disposed in this position the bolts 34 and 38 are securely tightened so as to thereafter prevent any lateral movement of the rods. Tightening may be effected while the rods 28 are in their elevated or upper position intermediate to rods 24 or after the row 26 of rods 28 has been lowered but before there has been any lateral movement of the rods 28 or rods 26.

In lieu of having both rows of rods loosely mounted when they are brought into engagement for accurately positioning, one of the rows may be accurately positioned through measurement and secured in place prior to bringing the two rows together. Thus, for example, the lower row 26 may be accurately positioned and the bolt 38 at each end of each rod securely tightened and, in fact, if desired, the rods may additionally be tack-welded. Thereafter, the lower row may be elevated into engagement with the upper row 22 with this upper row being loosely mounted such that the rods can move laterally within the limit of the slots 32 whereupon accurate relative positioning of the rods 24 with respect to the rods 28 is achieved while the two rows of rods are maintained in parallel relation to each other. After thus being accurately positioned, the upper row of rods 24 may be secured in place by means of tightening the bolts 34 at each end of the rods.

There is thus provided a rod type scrubber with a pair of rows or trays of scrubber rods which may be accurately positioned with close tolerance in a simple and expeditious manner to provide for effective performance of the scrubber.

What is claimed is:

1. In a rod type scrubber having a pair of spaced trays of parallel spaced rods extending transverse to the liquid and gas flow paths with the rods of one tray being alternately disposed with respect to the rods of the other tray and with there being means to adjust the trays with respect to each other, the spacing between the rods of one tray being less than the diameter of the rods of the other tray, the method of positioning the rods of one tray with respect to those of the other tray comprising mounting the rods of at least one tray in a manner to permit relative lateral movement therebetween, bringing the two trays together while in parallel planes such that the rods of the two trays are interspersed and in engagement with adjacent rods being in engagement generally throughout their length, and thereafter securing the rods in their then respective positions to prevent lateral movement therebetween within the tray when the rods are are moved out of engagement.

2. The method of claim 1 wherein the rods of both trays are initially mounted in a manner to permit relative lateral movement therebetween to thereby permit lateral adjustment of the rods of both rows when said rows are in engagement.

3. The method of claim 1 wherein the rods of only one tray are initially mounted in a manner to permit relative lateral movement therebetween for lateral adjustment when the two rows are in engagement.

* * * * *